United States Patent
Ikeda

(10) Patent No.: US 11,614,149 B2
(45) Date of Patent: Mar. 28, 2023

(54) GEAR SPEED CHANGE DEVICE

(71) Applicant: Masayuki Ikeda, Kurate-gun (JP)

(72) Inventor: Masayuki Ikeda, Kurate-gun (JP)

(*) Notice: Subject to any disclaimer, the term of this patent is extended or adjusted under 35 U.S.C. 154(b) by 0 days.

(21) Appl. No.: 17/625,043

(22) PCT Filed: Aug. 24, 2020

(86) PCT No.: PCT/JP2020/031850
§ 371 (c)(1),
(2) Date: Jan. 5, 2022

(87) PCT Pub. No.: WO2021/044888
PCT Pub. Date: Mar. 11, 2021

(65) Prior Publication Data
US 2022/0282773 A1   Sep. 8, 2022

(30) Foreign Application Priority Data
Sep. 5, 2019 (JP) .............................. JP2019-162067

(51) Int. Cl.
*F16H 3/72* (2006.01)
(52) U.S. Cl.
CPC .................... *F16H 3/725* (2013.01)
(58) Field of Classification Search
CPC . F16H 3/725; F16H 3/724; F16H 3/70; F16H 3/72; F16H 1/32; F16H 35/00; F16H 2035/001
See application file for complete search history.

(56) References Cited

U.S. PATENT DOCUMENTS

| 4,762,025 A * | 8/1988 | Lew .......................... F16H 1/32 475/176 |
| 4,807,494 A * | 2/1989 | Lew .......................... F16H 3/70 475/167 |
| 2015/0362045 A1 | 12/2015 | Ikeda |

FOREIGN PATENT DOCUMENTS

| JP | 2007-10047 A | 1/2007 |
| JP | 2009-127776 A | 6/2009 |
| JP | 2012026568 A * | 2/2012 ............... F16H 1/32 |
| JP | 2014-149038 A | 8/2014 |
| WO | WO-2021205613 A1 * | 10/2021 |

OTHER PUBLICATIONS

International Search Report dated Oct. 27, 2020, issued in counterpart International Application No. PCT/JP2020/031850, with English Translation. (6 pages).

* cited by examiner

Primary Examiner — Justin Holmes
(74) Attorney, Agent, or Firm — WHDA, LLP

(57) ABSTRACT

This gear speed change device is provided with an input unit 13 in which an eccentric guide portion 14 is formed centered about an eccentric position x1, on an input shaft 11 having an axial center x, an internal/external gear 20 which has external teeth 18 and internal teeth 19 having the center of rotation at the eccentric position x1, and one side of which is rotatably held by the eccentric guide portion 14, an output unit 24 which has an output shaft 12 on the axis x and on one side of which are formed internal teeth 22 that mesh with the external teeth 18 and that are centered about the axis x, and a rotation control unit 25 for controlling the rotational speed of the output unit 24.

14 Claims, 2 Drawing Sheets

GEAR SPEED CHANGE DEVICE

TECHNICAL FIELD

The present invention relates to a gear speed change device that changes the rotational speed of a input shaft at a desired gear ratio and transmits the rotation to an output shaft.

BACKGROUND ART

In the conventional speed change device, by intervening a single gear, a plurality of gears or the like between an input means (input shaft) and an output means (output shaft) such as an axle, the input torque and the rotation speed are changed and output. Such speed change devices are used, for example, in automobiles, and many stepless speed change devices that can change the gear ratio steplessly and continuously to transmit the rotation have been developed. For example, Patent Document 1, which is developed by the inventor of the present application, discloses a speed change device in which an internal/external gear having internal teeth and external teeth is used, the internal/external gear is gear-connected to an input means via the internal teeth and to an output means via the external teeth, and the rotation of the output means is controlled by making the internal/external gear revolve around the input means.

CITATION LIST

Patent Document

Patent Document 1: Japanese Unexamined Patent Application Publication No. 2009-127776

SUMMARY OF INVENTION

Technical Problem

According to the speed change device of Patent Document 1, the rotation of the output means can be easily changed by simply adjusting the circulating speed of the internal/external gear. However, in order to prevent reverse rotation when the output means is locked, the structure is such that the input means is supported by way of a one-way clutch. Therefore, in this speed change device, the shifting function is fulfilled well when the input means rotates in the forward direction, but the shifting function cannot be exhibited when the input means rotates in the reverse direction. In addition, there is a limit to reducing the number of parts constituting the speed change device and making it compact, since it is equipped with the one-way clutch.

The present invention has been made in consideration of the above circumstances, and an object thereof is to provide a gear speed change device in which a good shifting function is exhibited in both forward rotation and reverse rotation, while it has a simple structure and is compact, the operation can be stopped when the output shaft is locked, and the operation reliability and safety are excellent.

Solution to Problem

In order to achieve the above object, according to an aspect of the present invention, there is provided a gear speed change device comprising: an input unit including an input shaft to which a first driving means is connected on one side and an eccentric guide portion on another side, the eccentric guide portion being centered around an eccentric position deviated from an axis of the input shaft; an internal/external gear including a part on one side rotatably held by the eccentric guide portion, and external teeth and internal teeth formed on another side and having rotational centers thereof at the eccentric position; an output unit including a cylindrical portion on one side and an output shaft arranged coaxially with the input shaft on another side, the cylindrical portion having internal teeth meshing with the external teeth of the internal/external gear and having a rotational center thereof at the axis of the input shaft; and a rotation control unit controlling rotation transmitted from the input unit to the output unit, wherein the rotation control unit includes an external gear having external teeth meshing with the internal teeth of the internal/external gear and having a rotational center thereof at the axis of the input shaft, and a rotation control shaft having a part on one side linking to a part on another side of the external gear by way of a linking mechanism, arranged coaxially with the input shaft, penetrating a central portion of the output shaft, rotatably held by the output shaft and having a part on another side protruding from a part on another side of the output shaft to be connected to a second driving means; and the linking mechanism decenters the external gear to stop the input shaft and the rotation control shaft when the output shaft is locked while the input shaft and the rotation control shaft are rotating in a same direction.

Here, the input shaft and the output shaft are supported by bearings so as to be rotatable in the forward and reverse directions.

In the gear speed change device according to the aspect of the present invention, it is preferred that an annular recess centered on the eccentric position be formed on another side of the eccentric guide portion, and a fitting portion rotatably held in the annular recess be formed on the one side of the internal/external gear.

In the gear speed change device according to the aspect of the present invention, the linking mechanism can have an eccentric linking member arranged between the external gear and the rotation control shaft; the eccentric linking member can include a disk portion, a linking shaft connecting a part on one side of the disk portion and a part on the another side of the external gear at a position eccentric from an axis of the external gear, and a link pin protruding to another side of the disk portion at a position eccentric from the axis of the external gear and different from an axis of the linking shaft; and a linking recess can be formed on the one side of the rotation control shaft, and the link pin can be rotatably loosely fitted in the linking recess.

In the gear speed change device according to the aspect of the present invention, it is preferred that the link pin be arranged at a position symmetrical to the linking shaft with respect to the axis of the external gear.

In the gear speed change device according to the aspect of the present invention, it is further preferred that the external gear have a circular guide portion provided on another side of the external teeth of the external gear and fixing a part on one side of the linking shaft, a stepped notch be formed on the peripheral edge on another end side of the circular guide portion, a circular linking portion with the linking recess formed be provided on the one side of the rotation control shaft, and the linking mechanism include an elastic support member inserted so as to straddle outer circumferences of the notch, the disk portion and the circular linking portion.

In the gear speed change device according to the aspect of the present invention, the rotation control shaft can include a brim portion formed on another side of the circular linking portion and two or more fitting pins protruding concentrically on one side of the brim portion; and the linking mechanism can also include a stopper member having a tubular portion inserted so as to straddle outer circumferences of the circular guide portion and the elastic support member, and provided with a contact portion abutting on the outer circumferential surface of the circular guide portion, a flange portion formed on an outer circumference on another side of the tubular portion, and two or more fitting holes or fitting recesses formed in the flange portion, the fitting holes or the fitting recesses each loosely fitted with each of the fitting pins.

Advantageous Effects of Invention

In the gear change device according to the present invention, a good shifting function can be exhibited in both forward rotation and reverse rotation, while it has a simple structure and is compact. Besides that, the operation of the input unit (input shaft) and the rotation control unit (rotation control shaft) can be reliably stopped when the output shaft is locked, and the operation reliability and safety are excellent.

DESCRIPTION OF EMBODIMENTS

Subsequently, with reference to the accompanying drawings, descriptions will be given on an embodiment of the present invention for a better understanding of the present invention.

Figure 1:
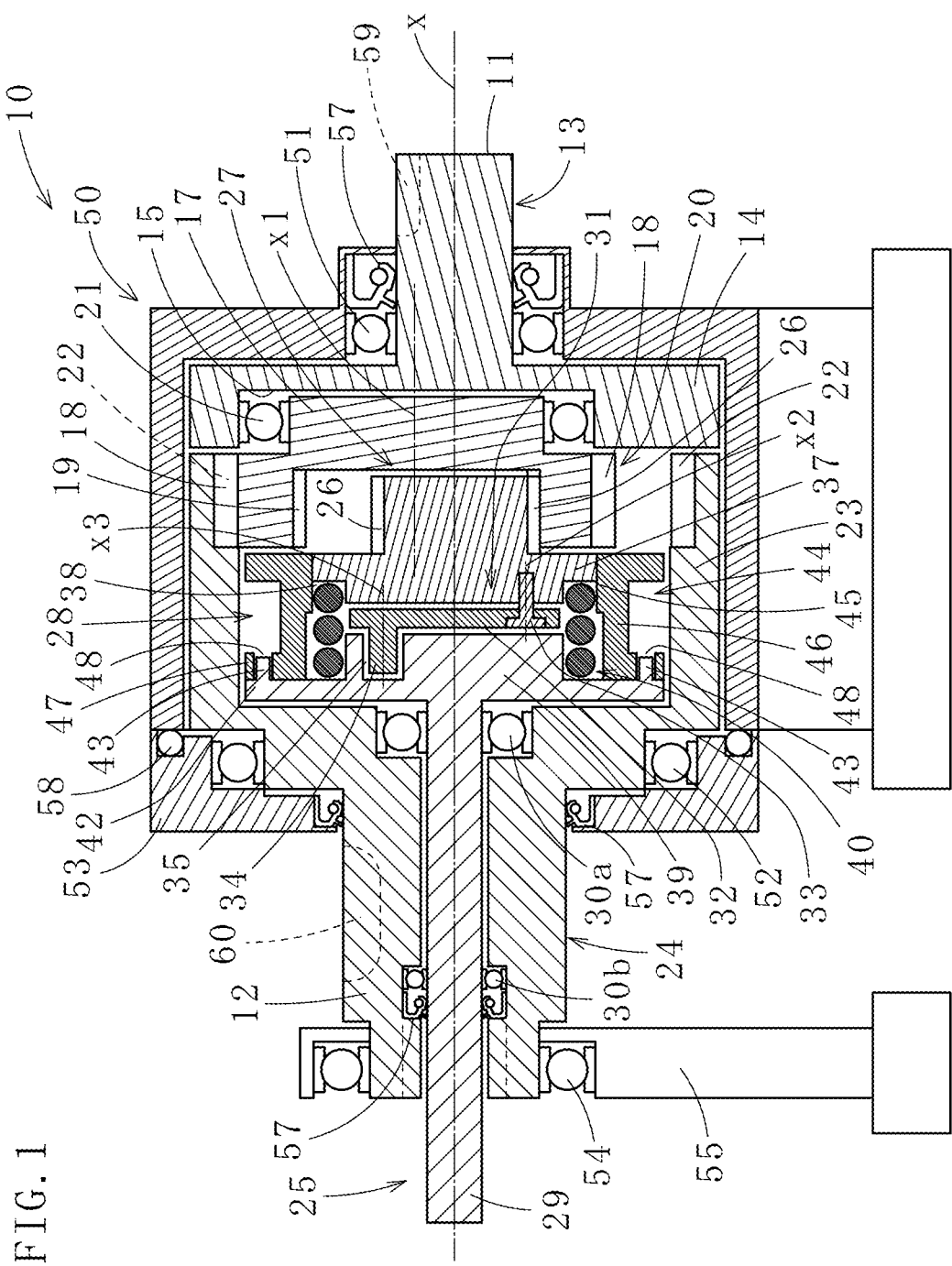
FIG. 1 is a side end view passing through an axis of an input shaft of a gear speed change device according to an embodiment of the present invention.

A gear speed change device 10 according to an embodiment of the present invention illustrated in FIG. 1 changes the rotation speed of an input shaft 11 at a desired gear ratio and transmits it to an output shaft 12. Incidentally, in FIG. 1, the right side of the drawing is one side (an input side) and the left side of the drawing is the other side (an output side).

The gear speed change device 10 includes an input unit 13 having the input shaft 11 to which a first driving means (not illustrated) is connected on one side. Further, the input unit 13 has an eccentric guide portion 14 provided on the other side of the input shaft 11. Then, an annular recess 15 centered on an eccentric position x1 deviated from an axis x of the input shaft 11 is formed on the other side of the eccentric guide portion 14. Furthermore, the gear speed change device 10 is equipped with an internal/external gear 20 with a fitting portion 17 rotatably held in the annular recess 15 on one side, and external teeth 18 and internal teeth 19 centered on the eccentric position x1 on the other side. At this time, the center of the fitting portion 17 also coincides with the eccentric position x1. Then, a beating 21 is attached between the annular recess 15 and the fitting portion 17, and the internal/external gear 20 can smoothly rotate with respect to the eccentric guide portion 14. Incidentally, the configuration in which a part on one side of an internal/external gear is rotatably held by an eccentric guide portion is not limited to the combination of the annular recess and the fitting portion, and can be appropriately selected.

Additionally, the gear speed change device 10 has an output unit 24 having a cylindrical portion 23 on one side and an output shaft 12 arranged coaxially with the input shaft 11 on the other side. Formed in the cylindrical portion 23 are internal teeth 22 that mesh with the external teeth 18 of the internal/external gear 20 and have their rotational center at the axis x of the input shaft 11. Moreover, the gear speed change device 10 includes a rotation control unit 25 that controls rotation transmitted from the input unit 13 to the output unit 24. The rotation control unit 25 has an external gear 27 with external teeth 26 that mesh with the internal teeth 19 of the internal/external gear 20 and have their rotational center at the axis x of the input shaft 11, and a rotation control shaft 29 whose one side is connected to the other side of the external gear 27 by way of a linking mechanism 28. The rotation control shaft 29 is arranged coaxially with the input shaft 11, penetrates the central portion of the output shaft 12, and is rotatably held by the output shaft 12. Then, the portion on the other side of the rotation control shaft 29 protrudes from the other side of the output shaft 12 and is connected to a second driving means (not illustrated). Bearings 30a and 30b are attached between the output shaft 12 and the rotation control shaft 29, and the rotation control shaft 29 can smoothly rotate with respect to the output shaft 12. Then, when the output shaft 12 is locked while the input shaft 11 and the rotation control shaft 29 are rotating in the same direction, the linking mechanism 28 can decenter the external gear 27 to stop the input shaft 11 and the rotation control shaft 29.

Hereinafter, the linking mechanism 28 will be described in detail.

The linking mechanism 28 has an eccentric linking member 31 arranged between the external gear 27 and the rotation control shaft 29. The eccentric linking member 31 has a disk portion 32 and a linking shaft 33 that connects one side of the disk portion 32 and the other side of the external gear 27 at a position x2 (also referred to as an axis x2) eccentric from the axis of the external gear 27 (coinciding with the axis x of the input shaft 11). The linking shaft 33 only needs to connect the disk portion 32 and the external gear 27, and the portion on one side of the linking shaft 33 may be screwed to the external gear 27 or may be fitted. Incidentally, the linking shaft may be formed integrally with the disk portion or the external gear so as to be fitted to the external gear or the disk portion. Furthermore, the eccentric linking member 31 has a link pin 34 that is eccentric from the axis of the external gear 27 (coinciding with the axis x of the input shaft 11), and protrudes to the other side of the disk portion 32 at a position x3 (also referred to as an axis x3) different from the axis x2 of the linking shaft 33. Then, a linking recess 35 into which the link pin 34 is rotatably loosely fitted is formed on one side of the rotation control shaft 29. In this embodiment, the link pin 34 is arranged at a position symmetrical to the linking shaft 33 with respect to the axial center of the external gear 27, but the arrangement can be appropriately selected.

In addition, the external gear 27 has a circular guide portion 37 provided on the other side of the external teeth 26 of the external gear 27 and to which the portion on the one side of the linking shaft 33 is fixed, and a stepped notch 38 is formed on the peripheral edge of the other end side of the circular guide portion 37. A circular linking portion 39 with a linking recess 35 is provided on the one side of the rotation control shaft 29, and the linking mechanism 28 is provided with an elastic support member 40 that is inserted so as to straddle the outer circumferences of the notch 38, the disk portion 32, and the circular linking portion 39. A coil spring is preferably used as the elastic support member 40, but the elastic support member is not limited thereto. The elastic support member only needs to allow the eccentric linking member 31 and the external gear 27 to move in the radial direction with respect to the rotation control shaft 29 (circular linking portion 39), and limit the amount of movement within a predetermined range. Therefore, as the elastic support member 40, for example, a cylindrical rubber body can be used instead of the coil spring.

Furthermore, the rotation control shaft 29 has a brim portion 42 formed on the other side of the circular linking portion 39 and two fitting pins 43 protruding concentrically on one side of the brim portion 42. The linking mechanism 28 includes a stopper member 44 that is inserted so as to straddle the outer circumferences of the circular guide portion 37 and the elastic support member 40. The stopper member 44 has a tubular portion 46 with a contact portion 45 abutting on the outer circumferential surface of the circular guide portion 37, and a flange portion 47 formed on the outer circumference of the other side of the tubular portion 46. Then, formed in the flange portion 47 is two fitting holes 48 into which the two fitting pins 43 are loosely fitted, respectively. As a result, the rotation of the rotation control shaft 29 can be transmitted to the stopper member 44 by way of the fitting pins 43. Incidentally, the flange portion may be provided with fitting recesses instead of the fitting holes. Further, the fitting pins only need to be able to transmit the rotation of the rotation control shaft to the stopper member, and the number of the fitting pins and their corresponding fitting holes (or fitting recesses) can be appropriately selected.

The input unit 13, the internal/external gear 20, the output unit 24, and the rotation control unit 25 are basically housed in a casing 50, and the one side of the input shaft 11 and the other sides of the output shaft 12 and the rotation control shaft 29 each project outward from the casing 50. Then, the input shaft 11 (input unit 13) is held by a bearing 51 so as to be rotatable in the forward and reverse directions with respect to the casing 50. Moreover, the portion on one side of the output shaft 12 (the portion on the other side of the cylindrical portion 23) is supported by a bearing 52 with respect to a cover portion 53 attached to the other side of the casing 50 so as to be rotatable in the forward and reverse directions, and the portion on the other side of the output shaft 12 is supported by a shaft support 55 having a beating 54 so as to be rotatable in the forward and reverse directions. Incidentally, one side of the casing 50 (the input side of the gear speed change device 10), the other side of the casing 50 (cover portion 53) (the output side of the gear speed change device 10), and the other side of the rotation control shaft 29 are each sealed by oil seals 57. Further, the mating surfaces of the casing 50 and the cover portion 53 are also sealed by a packing 58. The gear speed change device 10 can be made compact by arranging the input shaft 11, the output shaft 12, and the rotation control shaft 29 coaxially and accommodating the linking mechanism 28 inside the cylindrical portion 23.

An input motor, which is an example of the first driving means, can be connected to the one side of the input shaft 11, and a gear or the like is attached to the other side of the output shaft 12 to transmit (take out) the rotation of the output shaft 12 to the outside. Additionally, in order to control the rotation speed of the output shaft 12, an output rotation speed control motor, which is an example of a second driving means, can be connected to the other side of the rotation control shaft 29. The input motor and the output rotation speed control motor are known motors each having a structure for converting electric energy into rotation energy, and the motors configured so that the rotation speed and the rotation direction (forward direction and reverse direction) can be controlled are preferably used. However, in the gear speed change device 10, since the rotation speed of the output shaft 12 can be controlled by the rotation speed of the output rotation speed control motor (rotation control shaft 29), the rotation speed of the input motor may be constant. Incidentally, as illustrated in FIG. 1, by forming keyways 59 and 60 on the input shaft 11 and the output shaft 12, respectively, an input motor, gears, and the like can be easily and surely fixed to the input shaft 11 and the output shaft 12. However, these fixing methods can be appropriately selected.

Figure 2:
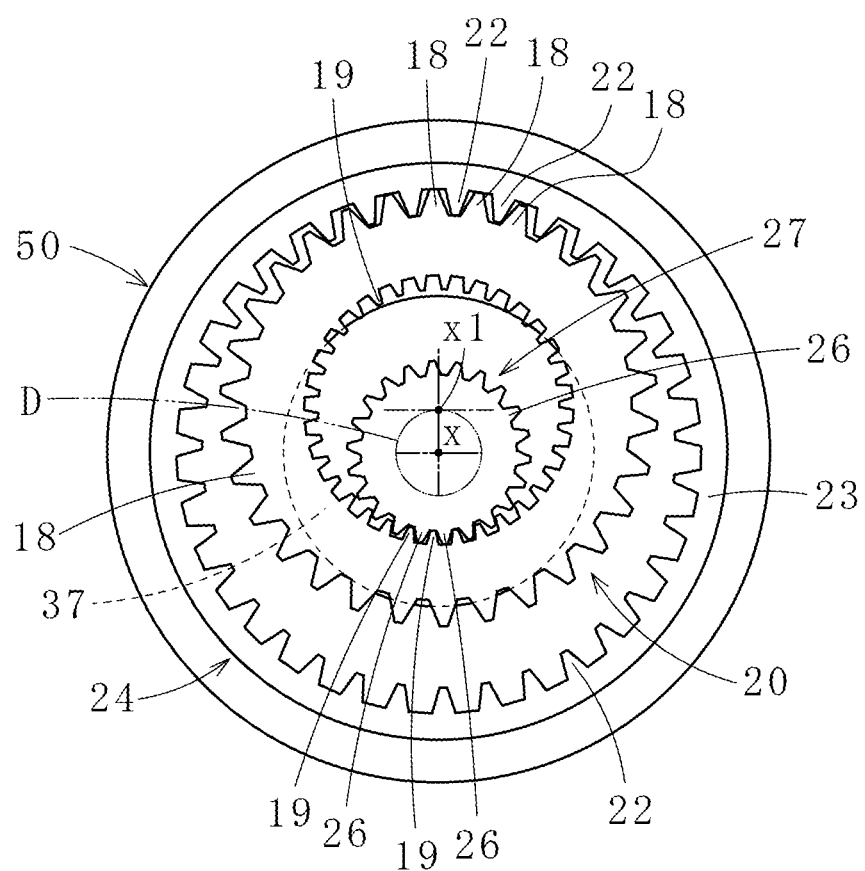
FIG. 2 is an explanatory diagram showing a meshing state of an internal/external gear, an output unit, and an external gear of the gear speed change device.

Hereinafter, the operation of the gear speed change device 10 will be described. First, when the input shaft 11 is rotated in one direction (forward rotation or reverse rotation) by the input motor (not illustrated) with the rotations of the output shaft 12 and the rotation control shaft 29 stopped, the eccentric guide portion 14 rotates around the axis x of the input shaft 11 together with the input shaft 11. Here, since the center of the annular recess 15 of the eccentric guide portion 14 is at the eccentric position x1 deviated from the axis x of the input shaft 11, the annular recess 15 rotates around the axis x so that its center (eccentric position x1) moves on the circumference of the virtual circle D illustrated in FIG. 2. Then, with the rotation of the eccentric guide portion 14 (annular recess 15), the internal/external gear 20 in which the fitting portion 17 is rotatably held in the annular recess 15 also rotates (circulates) together with the eccentric guide portion 14. At this time, since the external teeth 18 and the internal teeth 19 of the internal/external gear 20 mesh with the internal teeth 22 of the cylindrical portion 23 of the output unit 24 and the external teeth 26 of the external gear 27 of the rotation control unit 25, respectively, the internal/external gear 20 itself also rotates (revolves) around the eccentric position x1 that moves along the virtual circle D.

Therefore, with the external teeth 18 of the internal/external gear 20 and the internal teeth 22 of the output unit 24 (cylindrical portion 23) meshing with each other, the internal/external gear 20 circulates around the axis x while rotating around the eccentric position x1 (rotating in the direction opposite to the direction of circulating). As a result, the cylindrical portion 23 (output unit 24) can be decelerated (for example, to about ⅓ of the rotation speed of the input shaft 11) and rotated in the same direction as the eccentric guide portion 14 (input unit 13). At this time, the rotation control unit 25 is not driven, and the maximum reduction ratio can be obtained with the rotation control shaft 29 stopped. That is, the rotation speed of the output unit 24 (output shaft 12) is the lowest with respect to the rotation speed of the input unit 13 (input shaft 11).

Subsequently, the rotation control by the rotation control unit 25 will be described. From the above state, the output rotation speed control motor is driven to rotate the rotation control shaft 29 in the same direction as the rotation direction of the input unit 13 (input shaft 11). At this time, since the link pin 34 that connects the circular linking portion 39 on one side of the rotation control shaft 29 and the eccentric linking member 31 (disk portion 32) is located at the position x3 eccentric from the axis of the rotation control shaft 29 (which coincides with the axis of the external gear 27 and the axis x of the input shaft 11), a rotational moment is applied to the link pin 34 as the rotation control shaft 29 (circular linking portion 39) rotates, and the eccentric linking member 31 rotates with the rotation control shaft 29. Similarly, since the linking shaft 33 connecting the eccentric linking member 31 (disk portion 32) and the circular guide portion 37 on the other side of the external gear 27 is located at the position x2 eccentric from the axis of the rotation control shaft 29 (which coincides with the axis of the external gear 27 and the axis x of the input shaft 11), a rotational moment is applied to the linking shaft 33 as the eccentric linking member 31 rotates, and the external gear 27 rotates with the rotation control shaft 29 and the eccentric linking member 31. Here, the eccentric amounts of the axes x2 and x3 with respect to the axis x can be appropriately selected, but the larger the eccentric amount is, the larger the rotational moment applied to the linking shaft 33 and the link pin 34 becomes, and the rotation can be transmitted smoothly.

The elastic support member 40 is inserted so as to straddle outer circumferences of the notch 38 formed in the circular guide portion 37 to which one side of the linking shaft 33 is fixed, the disk portion 32 of the eccentric linking member 31, and the circular linking portion 39 with the linking recess 35 into which the other side of the link pin 34 is loosely fitted. In addition, the stopper member 44 is inserted so as to straddle outer circumferences of the circular guide portion 37 and the elastic support member 40. As a result, the external gear 27, the eccentric linking member 31, and the rotation control shaft 29 can be integrally rotated so that the axes of them are aligned with each other. At this time, since the external teeth 26 of the external gear 27 and the internal teeth 19 of the internal/external gear 20 are meshed with each other, the rotation of the external gear 27 is transmitted to the internal/external gear 20, and the rotation speed (circulating speed) of the internal/external gear 20 increases. Finally, the rotation speed of the output unit 24 (output shaft 12) also increases. Therefore, by rotating the rotation control shaft 29 in the same direction as the rotation direction of the input unit 13 (input shaft 11) from the state where the external gear 27 is stopped (fixed), the reduction ratio can be lowered and the rotation speed of the output unit 24 (output shaft 12) can be increased. Since the rotation speed of the output shaft 12 is proportional to the rotation speed of the rotation control shaft 29, the rotation speed of the input shaft 11 can be changed steplessly to output the rotation from the output shaft 12 and a desired gear ratio can be obtained by controlling only the rotation speed of the output rotation speed control motor. Moreover, when the rotation speed of the rotation control shaft 29 is the same as the rotation speed of the input shaft 11, the rotation speed of the input shaft 11 becomes the rotation speed of the output shaft 12 as it is, and it becomes in a non-decelerated state (the rotation speed of the output shaft 12 becomes the highest).

Subsequently, as described above, the operation (lock function) of the linking mechanism 28 when the rotation of the output shaft 12 (output unit 24) is stopped by an external load or the like while the rotation speed transmitted from the input shaft 11 to the output shaft 12 is controlled by the rotation control unit 25, that is, when the output shaft 12 is locked while the input shaft 11 and the rotation control shaft 29 are rotating in the same direction, will be described.

When the input shaft 11 and the rotation control shaft 29 rotate in the same direction and the output shaft 12 rotates at a predetermined rotation speed, even if the rotation of the output shaft 12 (output unit 24) is stopped, the input shaft 11 and the rotation control shaft 29 try to continue rotating as they are. At this time, since the external teeth 18 of the internal/external gear 20 mesh with the internal teeth 22 of the cylindrical portion 23 of the stopped output unit 24, a force for rotating the internal/external gear 20 in the direction opposite to the rotation direction of the input shaft 11 is generated. Then, since the internal teeth 19 of the internal/external gear 20 mesh with the external teeth 26 of the external gear 27, a force that rotates in the direction opposite to the rotation direction of the input shaft 11 is also generated in the external gear 27, the force is also transmitted to the disk portion 32 by way of the linking shaft 33, and a force for rotating the eccentric linking member 31 in the direction opposite to the rotation direction of the input shaft 11 is generated.

Here, the eccentric linking member 31 is connected to the rotation control shaft 29 by loosely fitting the link pin 34, which is provided at the position x3 eccentric from the axis of the rotation control shaft 29 (coinciding with the axis of the external gear 27 and the axis x of the input shaft 11), into the linking recess 35 formed in the circular linking portion 39 of the rotation control shaft 29. For this reason, the eccentric linking member 31 can rotate around the axis x3 of the link pin 34 with respect to the rotation control shaft 29. Therefore, when a force to rotate the external gear 27 and the eccentric linking member 31 in the direction opposite to the rotation direction of the input shaft 11 is generated with respect to the rotation control shaft 29 that continues to rotate in the same direction as the rotation direction of the input shaft 11, the external gear 27 and the eccentric linking member 31 rotate around the axis x3 of the link pin 34 in the direction opposite to the rotation direction of the input shaft 11, and twisting occurs in the linking mechanism 28 and the external gear 27 is eccentric. As a result, the axis x of the input shaft 11 and the axis of the rotation control shaft 29 deviate from the axis of the external gear 27 and their axes do not match, so that the clearance between the internal teeth 19 of the internal/external gear 20 and the external teeth 26 of the external gear 27 changes and a normal meshing state cannot be obtained (a state in which the external gear 27 bites into the internal/external gear 20), and the input shaft 11 and the rotation control shaft 29 can be stopped (the lock function is exhibited).

Incidentally, the amount of eccentricity of the external gear 27 at this time changes depending on the gap between the link pin 34 and the linking recess 35, the gap between the fitting pin 43 and the fitting hole 48, and the elasticity (deformation amount) of the elastic support member 40. Therefore, by setting these properly, during normal driving (when the input shaft 11 and the rotation control shaft 29 rotate in the same direction and the output shaft 12 is not locked), the rotation control unit 25 is integrally rotated, and the rotation input from the rotation control shaft 29 is transmitted to the internal/external gear 20 by way of the external gear 27 to control the rotation speed of the output shaft 12. When the output shaft 12 is locked and the normal driving state is released, the input shaft 11 and the rotation control shaft 29 can be stopped by decentering the external gear 27. Furthermore, the driving of the input motor and the output rotation speed control motor can be stopped by detecting that the rotations of the input shaft 11 and the rotation control shaft 29 have stopped from the torque, the rotation speed, or the like.

The present invention is not limited to the above-described embodiment, and its configuration can be changed without changing the gist of the present invention.

Metal is preferably used as the material of each gear, but, for example, engineering plastic can also be used depending on the application or the like. Moreover, as the first driving means, a power generating means such as an engine other than the motor may be used.

The shape of the casing and the number and arrangement of the bearings can be appropriately selected.

INDUSTRIAL APPLICABILITY

In the gear speed change device according to the present invention, since the rotation speed of the output shaft can be controlled (shifted) steplessly only by controlling the rotation speed of the second driving means such as the output rotation speed control motor while keeping the rotation speed of the first driving means such as the input motor constant, a hydraulic unit is not required, and the device can be made compact and suitably used as a transmission for electric vehicles, trains, etc. In particular, since the shifting function can be exerted regardless of the rotation direction (forward or reverse) of the input shaft, smooth acceleration/deceleration can be realized not only when moving forward but also when moving backward, and there is a great versatility. Further, since the linking mechanism has a lock function, for example, when a vehicle equipped with the gear speed change device according to the present invention becomes unable to travel due to a collision or the like and the rotation of the output shaft is stopped, the input shaft and the rotation control shaft can be stopped and furthermore the input motor and the output rotation speed control motor can be stopped. Therefore, it can also be used as a gear speed change device with a safety device.

REFERENCE SIGNS LIST

10: gear speed change device, 11: input shaft, 12: output shaft, 13: input unit, 14: eccentric guide portion, 15: annular recess, 17: fitting portion, 18: external teeth, 19: internal teeth, 20: internal/external gear, 21: bearing, 22: internal teeth, 23: cylindrical portion, 24: output unit, 25: rotation control unit, 26: external teeth, 27: external gear, 28: linking mechanism, 29: rotation control shaft, 30*a*, 30*b*: bearings, 31: eccentric linking member, 32: disc portion, 33: linking shaft, 34: link pin, 35: linking recess, 37: circular guide portion, 38: notch, 39: circular linking portion, 40: elastic support member, 42: brim portion, 43: fitting pin, 44: stopper member, 45: contact portion, 46: cylindrical portion, 47: flange portion, 48: fitting hole, 50: casing, 51, 52: bearings, 53: cover portion, 54: bearing, 55: shaft support, 57: oil seal, 58: packing, 59, 60: keyways

The invention claimed is:

1. A gear speed change device comprising:
   an input unit including an input shaft for connecting a first driving means on one side and an eccentric guide portion on another side, the eccentric guide portion being centered around an eccentric position deviated from an axis of the input shaft;
   an internal/external gear including a part on one side rotatably held by the eccentric guide portion, and external teeth and internal teeth formed on another side and having rotational centers thereof at the eccentric position;
   an output unit including a cylindrical portion on one side and an output shaft arranged coaxially with the input shaft on another side, the cylindrical portion having internal teeth meshing with the external teeth of the internal/external gear and having a rotational center thereof at the axis of the input shaft; and
   a rotation control unit controlling rotation transmitted from the input unit to the output unit,
   wherein the rotation control unit includes an external gear having external teeth meshing with the internal teeth of the internal/external gear and having a rotational center thereof at the axis of the input shaft, and a rotation control shaft having a part on one side linking to a part on another side of the external gear by way of a linking mechanism, arranged coaxially with the input shaft, penetrating a central portion of the output shaft, rotatably held by the output shaft and having a part on another side protruding from a part on another side of the output shaft to be connected to a second driving means; and
   the linking mechanism decenters the external gear to stop the input shaft and the rotation control shaft when the output shaft is locked while the input shaft and the rotation control shaft are rotating in a same direction.

2. The gear speed change device according to claim 1, wherein an annular recess centered on the eccentric position is formed on another side of the eccentric guide portion, and a fitting portion rotatably held in the annular recess is formed on the one side of the internal/external gear.

3. The gear speed change device according to claim 1, wherein the linking mechanism has an eccentric linking member arranged between the external gear and the rotation control shaft;
   the eccentric linking member includes a disk portion, a linking shaft connecting a part on one side of the disk portion and a part on the another side of the external gear at a position eccentric from an axis of the external gear, and a link pin protruding to another side of the disk portion at a position eccentric from the axis of the external gear and different from an axis of the linking shaft; and
   a linking recess is formed on the one side of the rotation control shaft, and the link pin is rotatably loosely fitted in the linking recess.

4. The gear speed change device according to claim 2, wherein the linking mechanism has an eccentric linking member arranged between the external gear and the rotation control shaft;
   the eccentric linking member includes a disk portion, a linking shaft connecting a part on one side of the disk portion and a part on the another side of the external gear at a position eccentric from an axis of the external gear, and a link pin protruding to another side of the disk portion at a position eccentric from the axis of the external gear and different from an axis of the linking shaft; and
   a linking recess is formed on the one side of the rotation control shaft, and the link pin is rotatably loosely fitted in the linking recess.

5. The gear speed change device according to claim 3, wherein the link pin is arranged at a position symmetrical to the linking shaft with respect to the axis of the external gear.

6. The gear speed change device according to claim 4, wherein the link pin is arranged at a position symmetrical to the linking shaft with respect to the axis of the external gear.

7. The gear speed change device according to claim 3, wherein the external gear has a circular guide portion provided on another side of the external teeth of the external gear and fixing a part on one side of the linking shaft, a stepped notch is formed on the peripheral edge on another end side of the circular guide portion, a circular linking portion with the linking recess formed is provided on the one side of the rotation control shaft, and the linking mechanism includes an elastic support member inserted so as to straddle outer circumferences of the notch, the disk portion and the circular linking portion.

8. The gear speed change device according to claim 4, wherein the external gear has a circular guide portion provided on another side of the external teeth of the external gear and fixing a part on one side of the linking shaft, a stepped notch is formed on the peripheral edge on another end side of the circular guide portion, a circular linking portion with the linking recess formed is provided on the one side of the rotation control shaft, and the linking mechanism includes an elastic support member inserted so as to straddle outer circumferences of the notch, the disk portion and the circular linking portion.

9. The gear speed change device according to claim 5, wherein the external gear has a circular guide portion provided on another side of the external teeth of the external gear and fixing a part on one side of the linking shaft, a stepped notch is formed on the peripheral edge on another end side of the circular guide portion, a circular linking portion with the linking recess formed is provided on the one side of the rotation control shaft, and the linking mechanism includes an elastic support member inserted so as to straddle outer circumferences of the notch, the disk portion and the circular linking portion.

10. The gear speed change device according to claim 6, wherein the external gear has a circular guide portion provided on another side of the external teeth of the external gear and fixing a part on one side of the linking shaft, a stepped notch is formed on the peripheral edge on another end side of the circular guide portion, a circular linking portion with the linking recess formed is provided on the one side of the rotation control shaft, and the linking mechanism includes an elastic support member inserted so as to straddle outer circumferences of the notch, the disk portion and the circular linking portion.

11. The gear speed change device according to claim 7, wherein the rotation control shaft includes a brim portion formed on another side of the circular linking portion and two or more fitting pins protruding concentrically on one side of the brim portion; and the linking mechanism includes a stopper member having a tubular portion inserted so as to straddle outer circumferences of the circular guide portion and the elastic support member, and provided with a contact portion abutting on the outer circumferential surface of the circular guide portion, a flange portion formed on an outer circumference on another side of the tubular portion, and two or more fitting holes or fitting recesses formed in the flange portion, the fitting holes or the fitting recesses each loosely fitted with each of the fitting pins.

12. The gear speed change device according to claim 8, wherein the rotation control shaft includes a brim portion formed on another side of the circular linking portion and two or more fitting pins protruding concentrically on one side of the brim portion; and the linking mechanism includes a stopper member having a tubular portion inserted so as to straddle outer circumferences of the circular guide portion and the elastic support member, and provided with a contact portion abutting on the outer circumferential surface of the circular guide portion, a flange portion formed on an outer circumference on another side of the tubular portion, and two or more fitting holes or fitting recesses formed in the flange portion, the fitting holes or the fitting recesses each loosely fitted with each of the fitting pins.

13. The gear speed change device according to claim 9, wherein the rotation control shaft includes a brim portion formed on another side of the circular linking portion and two or more fitting pins protruding concentrically on one side of the brim portion; and the linking mechanism includes a stopper member having a tubular portion inserted so as to straddle outer circumferences of the circular guide portion and the elastic support member, and provided with a contact portion abutting on the outer circumferential surface of the circular guide portion, a flange portion formed on an outer circumference on another side of the tubular portion, and two or more fitting holes or fitting recesses formed in the flange portion, the fitting holes or the fitting recesses each loosely fitted with each of the fitting pins.

14. The gear speed change device according to claim 10, wherein the rotation control shaft includes a brim portion formed on another side of the circular linking portion and two or more fitting pins protruding concentrically on one side of the brim portion; and the linking mechanism includes a stopper member having a tubular portion inserted so as to straddle outer circumferences of the circular guide portion and the elastic support member, and provided with a contact portion abutting on the outer circumferential surface of the circular guide portion, a flange portion formed on an outer circumference on another side of the tubular portion, and two or more fitting holes or fitting recesses formed in the flange portion, the fitting holes or the fitting recesses each loosely fitted with each of the fitting pins.

* * * * *